United States Patent [19]
Ramaswamy et al.

[11] Patent Number: 6,006,202
[45] Date of Patent: *Dec. 21, 1999

[54] METHOD TO PROVIDE SENSITIVITY INFORMATION FOR LOST-SALE (R, S,S) INVENTORY SYSTEMS

[75] Inventors: Sanjay Elathur Ramaswamy, Elmsford; Ying Tat Leung, Tarrytown; Dinah W. Cheng, Scarsdale, all of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/922,286
[22] Filed: Sep. 3, 1997
[51] Int. Cl.$^6$ ................................... G06F 17/60
[52] U.S. Cl. .................. 705/28; 705/10; 705/29
[58] Field of Search .................. 705/28, 29, 7, 705/8, 10; 364/918.4, 468.06, 468.07, 468.13, 468.14

[56] References Cited

U.S. PATENT DOCUMENTS

| | | | |
|---|---|---|---|
| 5,446,671 | 8/1995 | Weaver et al. | 364/468 |
| 5,699,259 | 12/1997 | Colman et al. | 364/468.05 |

OTHER PUBLICATIONS

Edward A. Silver and Rein Peterson, Decision Systems for Inventory Management and Production Planning, John Wiley & Sons, pp. 256–260, Mar. 21, 1985.

M. C. Fu and J–Q Hu, "(s,S) inventory systems with random lead times," Probability in the Engineering and Informational Sciences, vol.8, pp. 355–376, Jan. 1994.

P. Glasserman and S. Tayur, "Sensitivity analysis for base-stock levels in multiechelon production–inventory systems," Management Science, vol. 41, No. 2, pp. 263–281, Feb. 1995.

Michael C. Fu, "Sample Path Derivatives For (s,S) Inventory Systems," Operations Research, vol. 42, No. 2, pp.351–364, Apr. 1994.

*Primary Examiner*—Allen R. MacDonald
*Assistant Examiner*—John Campa
*Attorney, Agent, or Firm*—Whitham, Curtis & Whitham; Stephen C. Kaufman

[57] ABSTRACT

Sensitivity information about average lost sales and inventory levels of a lost-sale (s,S) inventory system with respect to the two decision variables s and S is used for "what-if" analysis and optimization of the decision variables. Computer software implements an algorithm that provides sensitivity of average inventory levels as well as average lost sales with respect to changes in s and $q(q=S-s)$ for a lost-sale inventory simulation for any specified demand distribution. The sensitivity information provided is exact when compared to a finite-difference simulation for the case of both discrete and continuous, stationary and non-stationary demands. A finite difference estimate of the sensitivity is obtained by running two simulations where the parameter in question (s or S) differ by a chosen small number, and then calculating the resulting difference in the performance measure of interest, in this case average inventory and lost sales.

15 Claims, 5 Drawing Sheets

METHOD TO PROVIDE SENSITIVITY INFORMATION FOR LOST-SALE (R, S,S) INVENTORY SYSTEMS

BACKGROUND OF THE INVENTION

1. Field of the Invention

The present invention generally relates to computer software for business management and, more particularly, to a computer implemented method for generating sensitivity information about average lost sales and inventory levels of a lost-sale (R,s,S) inventory system for what-if analysis and optimization of the decision variables s and S.

2. Background Description

The system under consideration manages the inventory level of an item where once every period or at recurring intervals, the inventory level is reviewed and, if necessary, purchase orders are placed to replenish depleted inventory, in accordance with a pre-specified decision rule. An (s,S) inventory policy is one such decision rule that specifies that an order be placed when the level of inventory on hand plus on order falls below the level s (a specified number), and the amount of order be the difference between S (another specified number) and the present level of inventory on hand plus on order; i.e., every time the inventory position (which refers to the sum of inventory on hand plus on order) falls below s, an order is placed to bring it up to S.

(s,S) policies are of great practical and theoretical interest, and much effort has gone into the determination of the appropriate values of s and S to optimize system performance measures and to obtain sensitivity information in this regard. The determination of these values becomes exceedingly complicated in the general case due to a number of factors. Specifically, the inventory system may be of the back order or lost sale type (depending on whether requests are backlogged or refused when there is no inventory on hand), and the demand distribution to which the system is subjected may vary over time. The term "demand distribution", as used in this description, means the statistics of the consumer demand per unit time period, in terms of known approximation forms for, and/or hypothetical models based on, probability density and distribution functions characterizing observed sales events or hypothetical sales statistics, respectively. The only requirement for the selected demand distributions are that they be unambiguous and that they provide sufficient information to generate values of simulated demand over the time horizon under consideration.

In such cases of determining appropriate values of s and S to optimize system performance measures and to obtain sensitivity information, simulation is a useful tool to obtain information about the expected performance. Due to the requirement that several replications of the simulation have to be done to obtain meaningful estimates of performance, and the fact that a typical manufacturer/retailer has thousands of items in inventory, the use of simulation to do sensitivity analysis to changes in s and S values becomes an extremely time consuming task. This has made undesirable and in some cases precluded the use of simulation to do performance analysis and optimization.

To address this problem, investigations into obtaining the sample path derivative of performance measures with respect to s and S have been conducted for the back order case with stationary demands. See M. C. Fu, "Sample path derivatives for (s,S) inventory systems", *Operations Research*, Vol. 42, No. 2, pp. 351–364 (1994). Extensions to address stochastic lead times are presented in M. C. Fu and J-Q Hu, "(s,S) inventory systems with random lead times", *Probability in the Engineering and Informational Sciences*, Vol. 8, pp. 355–376 (1994). The use of Perturbation Analysis to obtain sensitivity information on inventory levels for base stock multi-echelon systems in discussed in P. Glasserman and S. Taylor, "Sensitivity analysis for base-stock levels in multiechelon production-inventory systems", *Management Science*, Vol. 41, No. 2, pp. 263–281 (1995). However, none of the methods in the surveyed literature address either the lost sales case or the case with non-stationary demands.

SUMMARY OF THE INVENTION

It is therefore an object of the invention to provide sensitivity information about the average lost sales and inventory levels of a lost-sale (R,s,S) inventory system with respect to the two decision variables s and S and a review period fo inventory R.

It is another object of the invention to provide sensitivity information which is used for "what-if" analysis and optimization of the decision variables s and S.

The computer software method according to the invention implements an algorithm that provides sensitivity of both average inventory levels as well as average lost sales with respect to changes in s and q(q=S−s) for a lost-sale inventory simulation for any specified demand distribution. Further, the sensitivity information provided is exact when compared to a finite-difference simulation for the case of both discrete and continuous, stationary and non-stationary demands. A finite difference estimate of the sensitivity is obtained by running two simulations where the parameter in question (s or S) differ by a chosen small number, and then calculating the resulting difference in the performance measure of interest, in this case average inventory and lost sales.

The method according to the invention is at least two and up to three times faster than the equivalent method of obtaining the very same information using a set of finite difference simulations. By virtue of the fact that the method provides this sensitivity information for a type of inventory system that is both commonly found in real-life retail/distribution situations, as well as difficult to analyze mathematically, it can become a useful part of inventory control software to enable optimization and "what-if" analysis by the user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
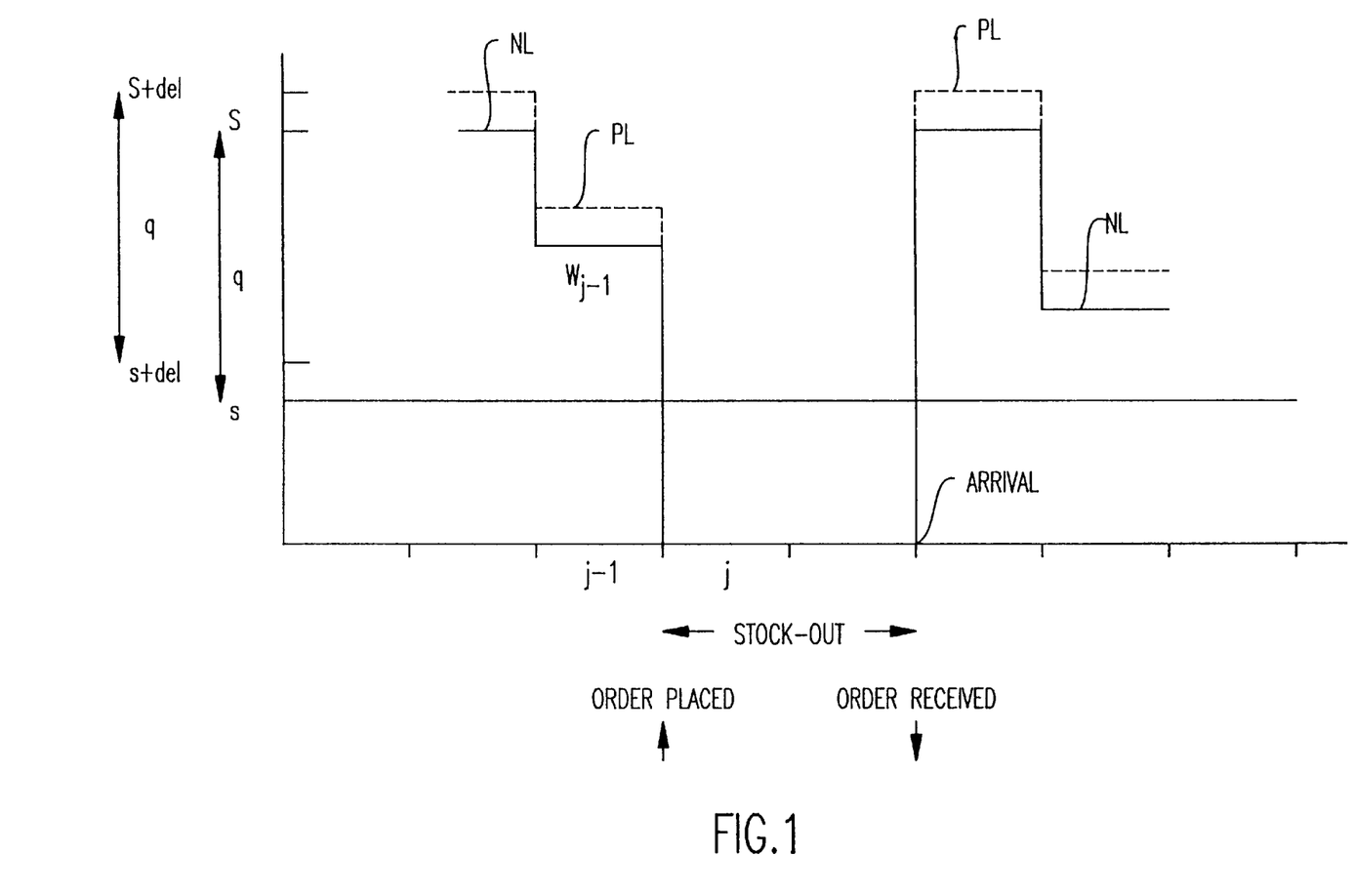
FIG. 1 is a graph of an inventory system with lost sales illustrating the effect on sample path of inventory levels with q fixed and s perturbed.

This invention will be described by first defining terms to be used, and describing the general method referring to FIG.

1, and then presenting a detailed embodiment by reference to the other drawings.

Problem Statement:

Let

T=time horizon under consideration;

I=1,2, . . . ,T be the index of time;

$Y_i$=inventory position in period I, where inventory position refers to stock on hand plus on order;

$W_i$=inventory level in period I, refers to physical stock on hand;

$K_i$=Lost Sales in period I;

$D_i$=randomly realized demand in period I;

L=order lead time, the time between placement of an order and its arrival;

$O_i$=incoming orders in period I;

s=Specified reorder point;

S=Specified order up to level

Consider an inventory system where at discrete and periodic time intervals, first incoming orders are received, the inventory position is reviewed and then an ordering decision is made at the beginning of the period according to the (s,S) policy; i.e., if at the start of the time period, the inventory position is below s, then an order is placed to bring it up to S. The demand for the period is then realized and subtracted at the end of the period. If $Y_i$ and $W_i$ are defined after order placement and before demand subtraction, then $Y_{i+1}=Y_i-\min(W_i,D_i)$ if $Y_i-\min(W_i,D_i) \geq s=S$ if $Y_i-\min(W_i,D_i)<s$ and $W_{i+1}=\max(0, W_i-D_i)+O_{i+1}$.

The lost sales at the end of each period are $K_i=\max(0, D_i-W_i)$ The performance measures of interest to us are $$\overline{W_T} = \frac{1}{T}\sum_{i=1}^{T} W_i \text{ and } \overline{K_T} = \frac{1}{T}\sum_{i=1}^{T} K_i$$

and we are interested in computing the sensitivity of these measures with respect to s and q where S=s+q; i.e., we would like to calculate $\Delta E(\overline{W_T})/\Delta s$, $\Delta E(\overline{K_T})/\Delta s$, $\Delta E(\overline{W_T})/\Delta q$, and $\Delta E(\overline{K_T})/\Delta q$, where E equals the average over the number of replications N of the simulation.

Due to the fact that in practice inventory systems deal with discrete units of items, demand is realized as a random integer, and the setting of s,S levels is also in integer values. The smallest value of $\Delta$ that is of interest is one unit. Changes in s or q less than one unit will result in the same inventory system as before and there will be no change in the performance measures. Clearly, then, for the purpose of sensitivity analysis or optimization of the decision variables, it is only necessary to be concerned with integer value changes in s and q.

The algorithm implemented by the method according to the invention calculates the effect on performance due to unit changes in s and q. During each replication of the finite horizon simulation, the effect of the perturbation or change in performance due to a unit change in s and q is calculated, and the effect averaged over a repeated number of replications.

If s1 is the initial value of s, and s2=s1+$\Delta$s, then the estimate made after N replications is $$E(\overline{W_T}(s1,q)-\overline{W_T}(s2,q))/\Delta s = E(\Delta \overline{W_T})/\Delta s = \Delta E(\overline{W_T})/\Delta \quad (1)$$

Equation (1) shows that the estimates made by running the algorithm are unbiased.

Considering first the sensitivity of inventory levels with respect to "s", an adjustment algorithm modifies the Infinitesimal Perturbation Analysis (IPA) based calculation for the back order case, which is described by (M. C. Fu, supra), and then further augments it with a finite difference simulation to account for event changes.

For this description a "nominal" system is defined as the base inventory system with the given, or initial, values of s and S. The nominal path is the inventory state of the nominal system with respect to an event sequence. The "perturbed" system is defined as that same inventory system except for having either the s or q values changes, or perturbed. The perturbed path is the inventory state of the perturbed system with respect to an event sequence. Also, Perturbation Analysis will be abbreviated as PA.

Referring to FIG. 1, and examining the nominal and perturbed path, shown as solid line NL and dotted line PL, respectively, with respect to a change of $\Delta$ in "s", and assuming initially that both paths have the same event sequence, it can be seen that the IPA algorithm described by (M. C. Fu, supra) is applicable except in periods where the inventory level becomes zero and a few periods thereafter. Specifically, when the inventory level becomes zero, and there is a lost sale, then the incremental increase of inventory in the perturbed path will not have any effect. Further, the nominal and perturbed paths (with respect to changes in s) come together at this time. The difference of $\Delta$ in the inventory levels of the two paths will reappear only on arrival of the first order placed after the inventory levels become zero, shown as the point ARRIVAL. Adjustments to this end are therefore made in the IPA calculations, and a new algorithm is termed as the adjusted IPA algorithm. This is illustrated in FIG. 1.

Event changes can occur when the Inventory Position of both the nominal and perturbed paths come together, which happens after the inventory level hits zero as described above, and falls between s and s+$\Delta$. The nominal system then does not place an order (since the inventory position is above s), but the perturbed system does (as the inventory position is below s+$\Delta$). At this point, a finite difference simulation is launched for the perturbed path and the differences in inventory level are recorded till such time that the event sequence for the paths come back together. When the event sequence becomes the same for both paths, then the method reverts to the adjusted IPA calculations.

For the case of sensitivity with respect to q, the algorithm remains the same except that event changes are now triggered by having the inventory position fall below s for the nominal system, such that the nominal system places an order but the perturbed system does not. Again a finite difference simulation is used to track the differences when the paths diverge, and the adjusted IPA algorithm used when the event sequences converge.

The implementation of the algorithm for the lost sale case involves additional computational effort due to the fact that at certain points in time, two finite difference calculations may be in progress; one for sensitivity with respect to s and the other for sensitivity with respect to q. The overall computation time is still, however, significantly faster than the equivalent method of performing three finite difference simulations.

Figure 2:
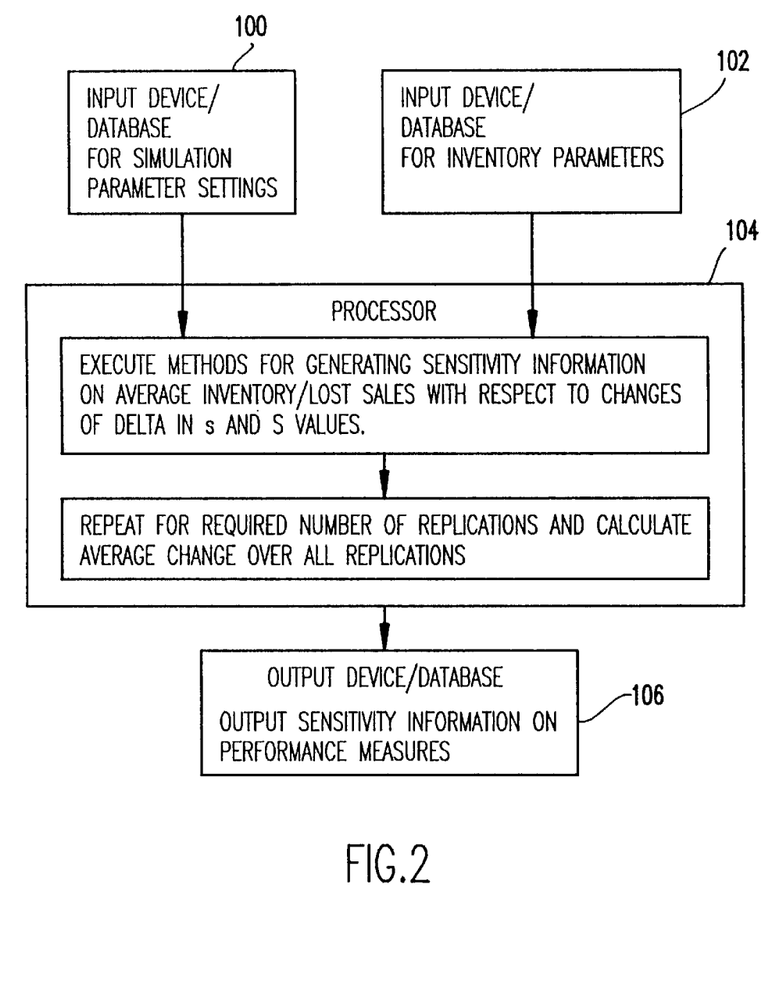
FIG. 2 is a schematic-type functional block diagram of an implementation of the present method for generating sensitivity information for inventory performance measures.

Referring to FIG. 2, a general system architecture for implementing this invention is shown, having a data input device or database 100 for storing and inputting simulation parameter settings, a data input device or database 102 for storing and inputting inventory parameters, a processor 104 for executing the steps described further below in reference to FIGS. 3, 4A and 4B, and a data output device or database 106 for outputting and storing the sensitivity information and performance measures obtained with the present method. It will be understood that the particular hardware on which the invention can be implemented and practiced includes any standard workstation (not shown) or personal computer (not shown) having a central processing unit, random-access memory, a mass storage unit, an optional accelerator card, and a data I/O device. Further, the invention can be implemented on a large scale computer system such as an IBM system 390, IBM AS400 or IBM RS6000.

Figure 3:
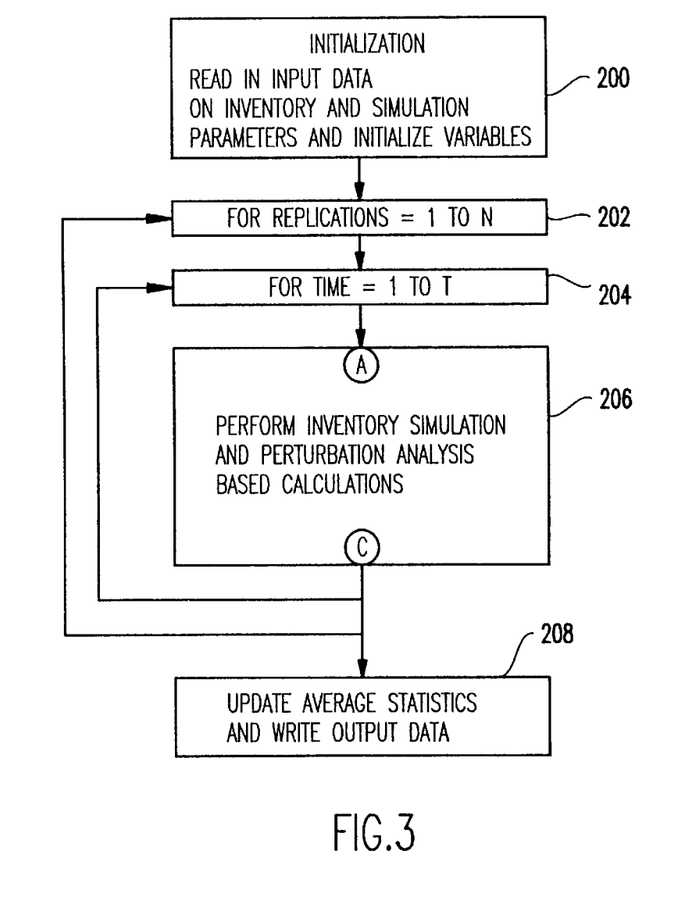
FIG. 3 is a flow diagram for the FIG. 2 schematic, depicting an example of the present method of providing sensitivity information.
Figure 4A:
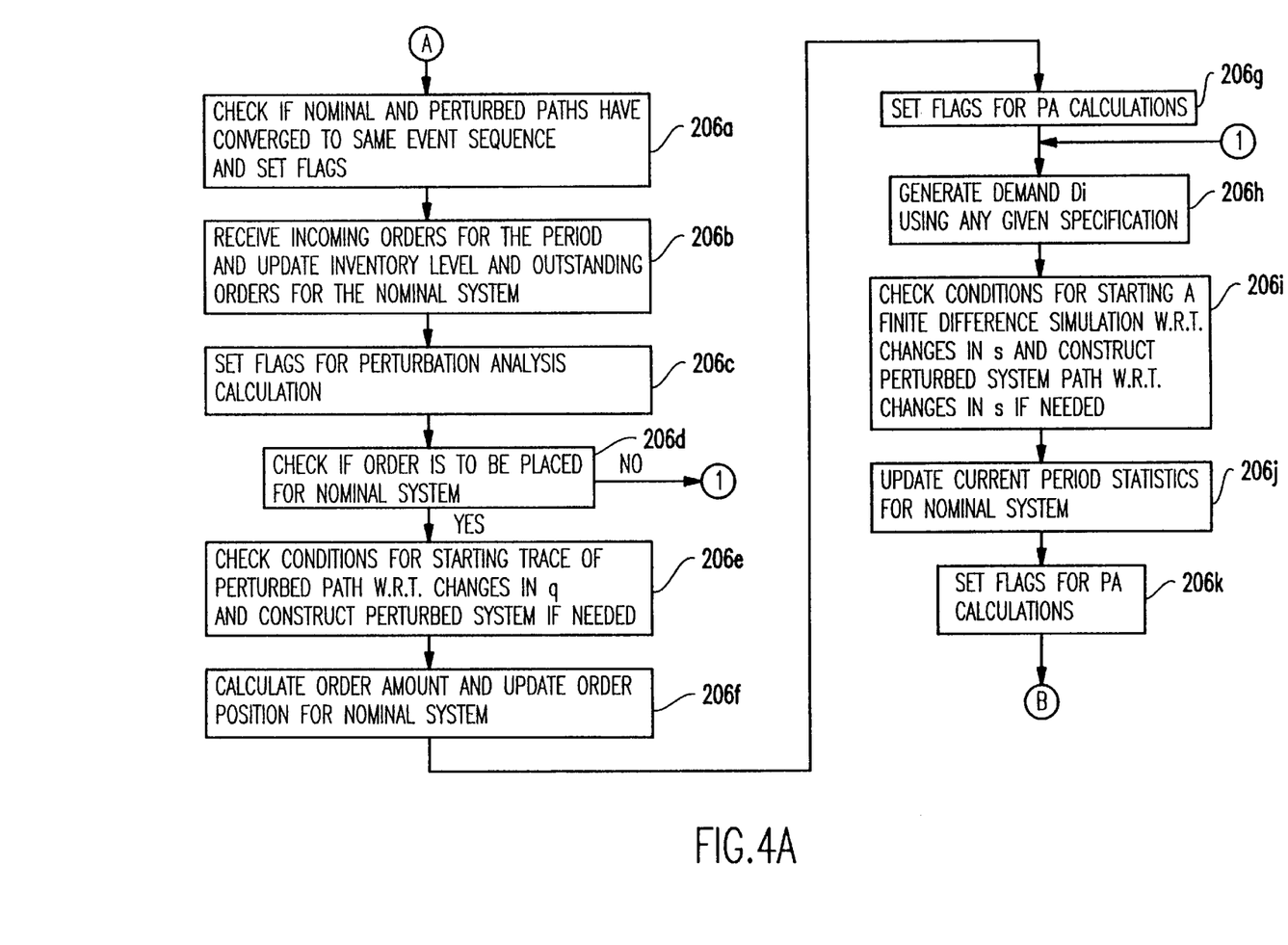
FIGS. 4A and 4B are an example of a sub-level flow diagram for a main block of the FIG. 3 flow diagram.
Figure 4B:
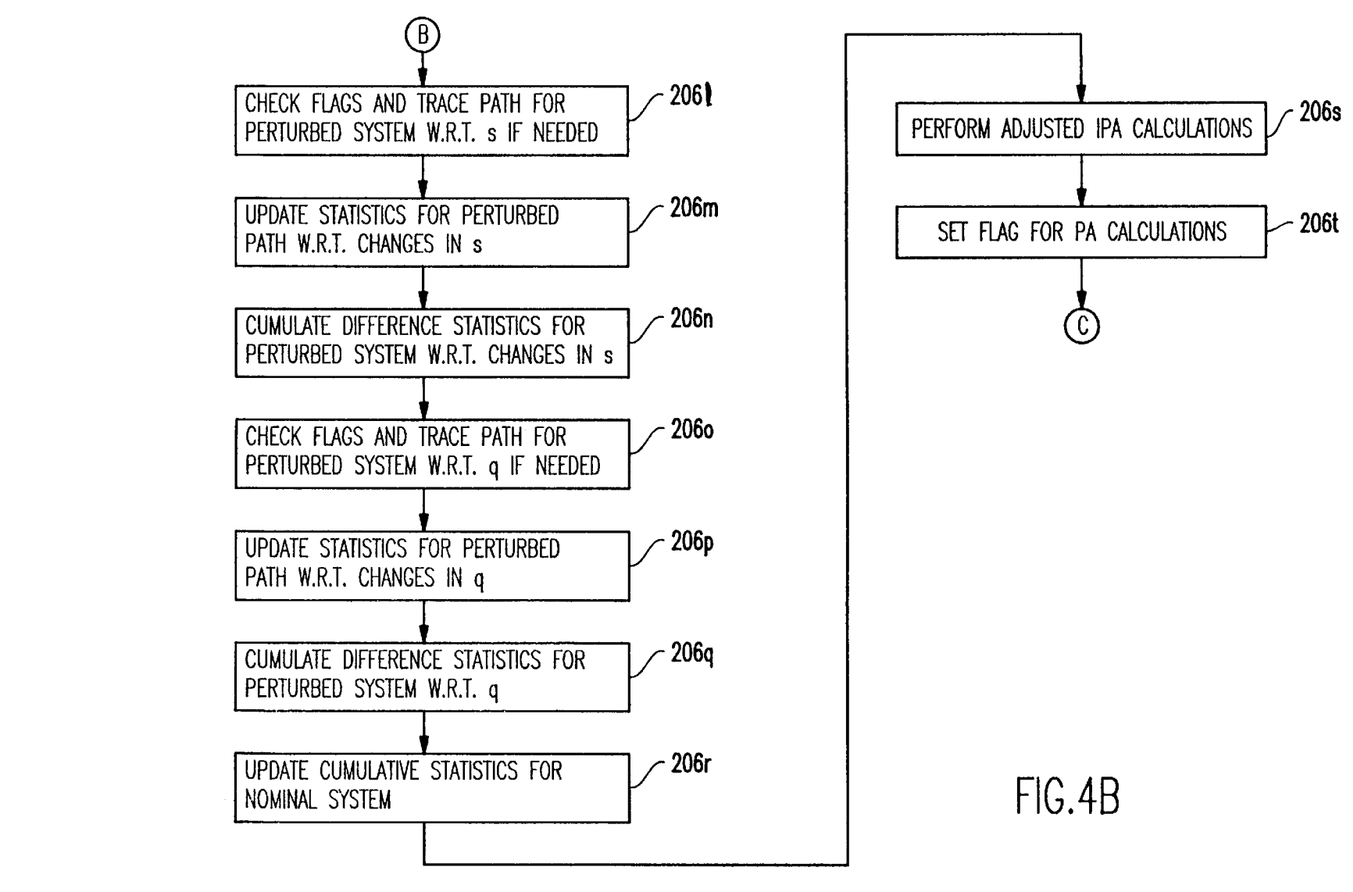

Referring to FIGS. 3, 4A and 4B, the following pseudocode is one example implementation for carrying out the present invention, and the pseudocode is commented for referencing the figures and for a ready understanding of its operations:

First, referring to FIG. 3, the initialization block 200 can, for example, be implemented by the following pseudocode block $Y_i=W_1=S$;

$O_i=0, I=1, \ldots T$;

TOTORD=0;

RCT_FLAG$_i$=1, I=1, ..., T;

HZERO=OFF;

OFLAG=OFF;

NOWHZERO=OFF;

PASWITCH=ON;

PAQSWITCH=ON;

JEPA=OFF;

JEPAQ=OFF;

DELTA=User input value, default value=1;

The default value of 1, which may be called logical ON, is for computing sensitivity with respect to a unit change in s.

Additionally, all other variables, which will be defined below, are initialized to zero.

Block 202 represents the steps in execution for Replications=1 to N,

More particularly, for Replications=1 to N the following are performed

```
{
    For Time Index I=1 to T, depicted in Figure 3
    as Block 204, perform
}
```

Block 206a of FIG. 4A, which checks if the nominal and perturbed systems have converged to the same event sequence and set flags, and which can be implemented by the following example pseudocode

```
If (PASWITCH==OFF)
    If ((PW_i -W_i)==DELTA) AND ((PY_i-Y_i)==DELTA)
    AND (HZERO==OFF)
        then PASWITCH=ON;
If (PAQSWITCH==OFF)
    If ((PqW_i-W_i)==DELTA) AND
        ((PqY_i-Y_i)==DELTA) AND (HZERO==OFF)
        then PAQSWITCH=OFF;
```

Next, the process goes to block 206b in FIG. 4A, which receives incoming orders for the period I, and updates the inventory level and the outstanding orders for the nominal system. Block 206b can be implemented by the following example pseudocode $W_i=W_i+O_i$;

TOTORD=TOTORD-$O_i$;

Next, the process goes to block 206c of FIG. 4A, where it sets certain flags for PA calculation, which can be performed by the following pseudocode

```
If (RCTFLAG_i==0)
    then HZERO=OFF;
```

After the above-described block 206c, the process goes to a conditional branch block 206d, which checks if an order is to be placed for the nominal system, shown, for this example by the following pseudocode

```
If Y_i<s, then
{
perform blocks 206e and 206f. Block 206e, as
can be seen from the example pseudocode below,
checks conditions for starting a trace of the
perturbed path with respect to changes in q,
and constructs a perturbed system with respect
to change in q from the current system state.
If Y_i is not less than s, this example
implementation jumps to block 206g described
further below. Block 206e's example pseudocode
is
If ((s-Y_i) <= DELTA) AND (HZERO==OFF)
    If (PAQSWITCH==ON)
    {PqW_i=W_i+DELTA;
    PqTOTORD=TOTORD;
    PqY_i=Y_i+DELTA;
    PqO_j=O_j, j=I,..,T;
    PAQSWITCH=OFF;
    JEPAQ=ON;
    }
and the block 206f example pseudocode is
ORDAMT=S-Y_i;
O_{i+L}=O_{i+L}+ORDAMT;
TOTORD=TOTORD+ORDAMT
Y_i=Y_i+ORDAMT;
```

Next, block 206g is performed, which sets flags for PA calculations. An example pseudocode is

```
If (OFLAG==ON)
    {
    RCT_FLAG_{i+L}=0;
    OFLAG = OFF;
    }
}
```

After block 206g, the process goes to block 206h, which is where it had jumped to if $Y_i$ was greater than s at block 206d. Block 206g generates demand $D_i$ using any given suitable demand distribution. A pseudocode for block 206h is not necessary for this description, as demand generating algorithms and software are well known in the art.

After the generate demand of block 206h the process goes to block 206i. Block 206i checks conditions for starting a finite difference simulation with respect to changes in s, and constructs a perturbed system with respect to changes in s if needed. An example pseudocode is:

```
If (No Order is Placed) AND (HZERO==ON) AND
    ((Y_i-s) <DELTA)
{   The following sub-block of the pseudocode
    constructs a perturbed system with respect
    to changes in s from the current system
    state
    If (PASWITCH==ON)
    {
```

```
PW_i=W_i;
PTOTORD = TOTORD;
PY_i=Y_i;
PO_j=O_j, j=1,...,T;
PASWITCH=OFF;
JEPA=ON;
    }
}
```

The process then goes to block 206*j* of FIG. 4A and updates current period statistics using, for this example, the following pseudocode;

$OLDW_i = W_i$;
$K_i = \max(0, D_i - W_i)$;
$W_i = \max(0, W_i - D_i)$;
$Y_i = W_i + TOTORD$;

The process then proceeds to block 206*k* of FIG. 4A, which sets certain ones of the conditional flags for PA calculations, and which is performed, for this example, by the following pseudocode;

```
If (W_i==0) AND (HZERO=OFF) AND (K_i>0)
{
    HZERO=ON;
    NOWHZERO=ON;
    OFLAG=ON;
}
```

Referring now to FIG. 4B, the present process, after completing the above-described block 206*k* shown on FIG. 4A, goes to block 206*l*, which checks flags and traces the path for the perturbed system with respect to s if needed. Block 206*l* is implemented, for this example, by the following pseudocode:

```
If (PASWITCH==OFF)
{
    If (JEPA=OFF)
    {
        PW_i=PW_i+PO_i;
        PTOTORD=PTOTORD-PO_i;
        PY_i=PW_i+PTOTORD;
    }
    ELSE
    JEPA=OFF;
```

The following sub-block of pseudocode within block 206*l* checks if an order for goods is to be placed for the perturbed system:

```
If (PY_i<s+DELTA) then
{
    PORDAMT=S+DELTA-PY_i;
    PO_{i+L}=PO_{i+L}+PORDAMT;
    PTOTORD=PTOTORD+PORDAMT
    PY_i=PY_i+PORDAMT;
}
```

As shown by FIG. 4B, the present process, after completing the above-described block 206*l*, goes to block 206*m*, which updates statistics for the perturbed path with respect to changes in s, and which can be implemented by the following example pseudocode:

$POLDW_i = PW_i$;
$PK_i = \max(0, D_i - PW_i)$;
$PW_i = \max(0, PW_i - D_i)$;
$PY_i = PW_i + PTOTORD$;

After completing the above-described block 206*m*, the present process goes to block 206*n*, which cumulates difference statistics for the perturbed system with respect to changes in s. Block 206*n* can be implemented by the following example pseudocode:

$PTOTK = PTOTK + (PK_i - K_i)$;
$PTOTW = PTOTW + (PW_i - W_i)$;

Next, after completing the above-described block 206*n*, the present process goes to block 206*o*, which checks flags and the traces the path for the perturbed system with respect to changes in q if necessary, and which can be implemented by the following example pseudocode:

```
If (PAQSWITCH==OFF)
{
    If (JEPAQ=OFF)
    {
        PqW_i=PqW_i+PqO_i;
        PQTOTORD=PQTOTORD-PqO_i;
        PqY_i=PqW_i+PQTOTORD;
    }
    ELSE
    JEPAQ=OFF;
```

The following sub-block of pseudocode within block 206*o* checks if an order is to be placed for the perturbed system:

```
If (PqY_i<s) then
{
    PQORDAMT=S+DELTA-PqY_i;
    PqO_{i+L}=PqO_{i+L}+PQORDAMT;
    PQTOTORD=PQTOTORD+PQORDAMT
    PqY_i=PqY_i+PQORDAMT;
```

After completing the above-described block 206*o*, the process goes to block 206*p*, which updates the updates statistics for the nominal system. This processing block 206*p* can be implemented by the following example pseudocode:

$PQOLDW_i = PqW_i$;
$PqK_i = \max(0, D_i - PqW_i)$;
$PqW_i = \max(0, PqW_i - D_i)$;
$PqY_i = PqW_i + PQTOTORD$;

Next, after completing the above-described block 206*p*, the present process goes to block 206*p*, and cumulates the difference statistics for the perturbed system with respect to q, using the following example pseudocode

```
PQTQTK=PQTOTK+(PqK_i-K_i);
PQTOTW=PQTOTW+(PqW_i-W_i);
}
```

After completing the above-described block 206*q* the process goes to block 206*r*, which updates the cumulative statistics characterizing the nominal system's performance, using the following example pseudocode $TOTK = TOTK + K_i$
$TOTW = TOTW + W_i$ Next, the process moves to block 206*s* and performs adjusted IPA calculations, using, for example, the following pseudocode

```
IF(K_i>0)AND(OLDW_i>=0)
{
    IF ((HZERO==OFF) OR (RCT_FLAG_i==0) OR
        (NOWHZERO==ON))
```

-continued

```
    {
        IF PASWITCH==1 THEN DWDSMINUS+=DELTA;
        IF PAQSWITCH==1 THEN DWDQMINUS+=DELTA;
    }
}
IF (W_i>=0) AND (K_i==0)
{
    IF (HZERO==OFF) OR (RCT_FLAG==0)
    {
        IF PASWITCH==1 THEN DWDSPLUS+=DELTA;
        IF PAQSWITCH==1 THEN DWDQPLUS+=DELTA;
    }
}
```

The final step of the example process block 206 of FIG. 3 is block 206t shown in FIG. 4B. Block 206t sets the flags for the PA calculations. An example pseudocode for implementing this block is

```
            NOWHZERO=OFF;
        }
    }
```

After the N replications through functional blocks 202, 204 and 206 of FIG. 3, the average statistics characterizing the sensitivity of the system with respect to a $\Delta$ change in s and q, are updated at block 208 by, for example, the following pseudocode:

$\Delta E(\overline{W_T})/\Delta s=(DWDSPLUS+PTOTW)/(N*T);$ $\Delta E(\overline{K_T})/\Delta s=(-DWDSMINUS+PTOTK)/(N*T);$ $\Delta E(\overline{W_T})/\Delta q=(DWDQPLUS+PQTOTW)/(N*T );$ $\Delta E(\overline{K_T})/\Delta q=(-DWDQMINUS+PTOTK)/(N*T);$ While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for generating sensitivity information about average lost sales and inventory levels of a lost-sale (R,s,S) inventory system where R is a review period for inventory, s is a specified reorder point, and S is a specified order up to a level value such that when an inventory position is below s at a start of a time period an order is placed to bring an inventory position up to S, said method comprising the steps of:

reading input data from databases on inventory and simulation parameters and initializing variables, said simulation parameters including a perturbation value $\Delta$;

for a time horizon under consideration, performing an inventory simulation with a perturbation analysis, the perturbation analysis including a tracking of a plurality of paths of events representing an inventory state of a nominal system based on s and S, and an inventory state of two perturbed systems based, respectively on s and q perturbed by the value $\Delta$, where a q value=(S–s), using a combination of an adjusted Infinitesimal Perturbation Analysis algorithm and a set of finite difference calculations;

based on the perturbation analysis for the time horizon under consideration, calculating an output average sensitivity information on performance measures reflecting average inventory and average lost sales per unit change in s and q, and updating average statistics;

writing said output average sensitivity information to an output database; and managing an inventory level of said (R,s,S) inventory system based on said average sensitivity information.

2. A computer implemented method for generating sensitivity information about average lost sales and inventory levels according to claim 1, wherein said step of reading input data from databases on inventory and simulation parameters and initializing variables, said parameters including a perturbation value $\Delta$ comprises the steps of:

initializing a reorder point value s, and a reorder-up-to level value S;

initialzing, for a stating time index t=0 with nominal system values corresponding to s and S values, a time-indexed nominal system physical inventory value, a time-indexed nominal system stock delivery value, a time-indexed nominal system stock on order value, and a time-indexed sum of the time-indexed nominal system physical inventory and the nominal system stock-on-order value; and setting the $\Delta$ value representing a delta change in the reorder point s and in a q point.

3. A computer implemented method for generating sensitivity information about average lost sales and inventory levels according to claim 2 wherein said step of reading input data from databases on inventory and simulation parameters and initializing variables, said parameters including a perturbation value $\Delta$ further comprises the steps of:

initializing a first plurality of flags representing a sequence of events associated with the physical inventory of the nominal system, a first perturbed system, and a second perturbed system, said first perturbed system being said system based on said s value perturbed by the $\Delta$ value, said second perturbed system being said system based on said q value perturbed by the $\Delta$ value;

initializing a second plurality of flags representing a system state of said nominal system, with respect to said time increment t, said system state including whether or not an order has been placed prior to t, whether or not an inventory is less than or equal to a zero value, and whether or not an order is being received.

4. A computer implemented method for generating sensitivity information about average lost sales and inventory levels according to claim 3 wherein said step of performing an inventory simulation with perturbation analysis for a time horizon under consideration comprises the steps of:

determining if the nominal path and the first perturbed path and the nominal path and the second perturbed path are at a converged value in accordance with a flag from said first and second plurality of flags;

modifying the nominal system physical inventory value and the nominal system stock delivery value based on the nominal system stock on order value;

checking if an order is to be placed, based on the s value and the nominal system physical inventory value, and if the order is to be placed, performing steps (a) and (b) of (a) constructing a perturbed path with respect to the change in q corresponding to said $\Delta$ value in response to first and second plurality of flags, and (b) calculating a value for the order based on the nominal system physical inventory value and the S value;

setting said second plurality of flags based on the system state of the nominal system;

generating a demand value;

constructing a perturbed system path with respect to the change in s corresponding to said $\Delta$ value based on a state of said first plurality of flags;

updating a plurality of period statistics representing said nominal system physical inventory value and a lost sale value;

tracing a path for the first perturbed system based on the plurality of period statistics from said updating step and a condition of said first and second plurality of flags;

updating a second plurality of period statistics representing said first perturbed system physical inventory value and a first perturbed system lost sale value;

cumulating at least one of said second plurality of difference statistics for the first perturbed system with respect to the change in s corresponding to the $\Delta$ value;

tracing a path for the second perturbed system based on a state of said first and second plurality flags;

updating a plurality of period statistics for the second perturbed system with respect to the change in q corresponding to the $\Delta$ value;

cumulating a plurality of difference statistics for the second perturbed system with respect to changes in q corresponding to the $\Delta$ value;

updating a plurality of cumulative statistics for the nominal system based on said step of updating a plurality of period statistics;

performing an adjusted infinitetessimal perturbation analysis calculations based on a state of the second plurality of flags;

incrementing the value t of the time increment counter;

if the value t is less than T repeating the step of determining if the nominal path and the first perturbed path and the nominal path and the second perturbed path are at a converged value and all subsequent steps in order.

5. A computer implemented method for generating sensitivity information about average lost sales and inventory levels according to claim 4, further comprising the step of replicating, for a time horizon under consideration, the step of performing an inventory simulation with perturbation analysis, wherein the step of generating a demand value in each replication uses a random demand value based on a predetermined statistical model, and wherein said step of calculating an output average sensitivity information on performance measures reflecting average inventory and average lost sales per unit change in s and q, and updating average statistics where q=(S−s) outputs said average statistics reflecting said replications.

6. A computer implemented method for generating sensitivity information about average lost sales and inventory levels according to claim 1, further comprising the step of replicating, for a time horizon under consideration, the step of performing an inventory simulation with perturbation analysis, wherein each replication uses a series of random demand values based on a predetermined statistical model, and wherein said step of calculating an output average sensitivity information on performance measures reflecting average inventory and average lost sales per unit change in s and q, and updating average statistics where q=(S−s) outputs said average statistics reflecting said replications.

7. A computer implemented method for generating sensitivity information about average lost sales and inventory levels according to claim 1, wherein said step of using a combination of an adjusted Infinitesimal Perturbation Analysis algorithm and a set of finite difference calculations includes:

a) using a predetermined number of switches to recognize events that trigger path changes, b) switching between the adjusted IPA algorithm and the set of finite difference equations based on a configuration of said switches, and c) computing gradient estimates as a sum ofthe adjusted IPA algorithm and the set of finite difference calculations over said time horizon.

8. A computer implemented method for generating sensitivity information about average lost sales and inventory levels according to claim 1, wherein said managing step includes placing purchase orders to replenish depleted inventory based on said output sensitivity information calculated in said calculating step.

9. A computer implemented method for generating sensitivity information about average lost sales and inventory levels according to claim 1, wherein when said inventory position is below s said inventory position is zero.

10. A computer system for generating sensitivity information about average lost sales and inventory levels of a lost-sale (R,s,S) inventory system where R is a review period for inventory, s is a specified reorder point and S is a specified order up to level value such that when an inventory position is zero and falls below s at a start of a time period an order is placed to being an inventory position up to S comprising:

a first input database containing inventory parameters;

a second input database containing simulation parameters;

a processor connected to said first and second input databases, said processor reading said inventory parameters and said simulation parameter settings and executing methods for calculating average unit change in s and q over all replications and updating average statistics where a q value=(S−s), said methods being executed for a predetermined number of replications and for a time horizon under consideration, said processor having means for tracking of a plurality of paths of events representing an inventory state of a nominal system based on s and S, and an inventory state of two perturbed systems based, respectively, on s and q perturbed by the value $\Delta$, said processing using a combination of an adjusted Infinitesimal Perturbation Analysis algorithm and a set of finite difference calculation based on a convergence of said plurality of paths, and said processor calculating an average change over all replications, wherein application of said combination includes: using a predetermined number of switches to recognize events that trigger path changes, and switching between the adjusted IPA algorithm and the set of finite difference equations based on a configuration of said switches; and an output database connected to the processor, said processor outputting sensitivity information on performance measures to said output database, said (R,s,S) inventory system managing an inventory level of said system based on said average sensitivity information.

11. A computer implemented method for generating sensitivity information as recited in claim 10, wherein said processor includes:

a) means for using a predetermined number of switches to recognize events that trigger path changes, b) means for switching between the adjusted IPA algorithm and the set of finite difference equations based on a configuration of said switches, and c) means for computing gradient estimates as a sum of the adjusted IPA algorithm and the set of finite difference calculations over said time horizon.

12. A computer-implemented method for generating sensitivity information with respect to s and S values in an (R,s,S) inventory system, comprising the steps of:

initializing a reorder point s value, and a reorder-up-to level S value;

initializing, for a starting time index t=0, a time-indexed nominal system physical inventory value, a time-indexed nominal system stock delivery value, a time-indexed nominal system stock on order value, and a time-indexed sum of the nominal system physical inventory and the nominal system stock on order value, said nominal system values corresponding to said s and S values;

setting a $\Delta$ value representing a delta change in the reorder point s and in a q point, where q=(S−s);

initializing a first plurality of flags representing a sequence of events associated with the physical inventory of the nominal system, a first perturbed system, and a second perturbed system, said first perturbed system based on said s value perturbed by the $\Delta$ value, said second perturbed system based on said q value perturbed by the $\Delta$ value;

initializing a second plurality of flags representing a system state of said nominal system, with respect to said time increment t, said system state including whether or not an order has been placed prior to t, whether or not an inventory is less than or equal to a zero value, and whether or not an order is being received;

determining if the nominal path and the first perturbed path and the nominal path and the second perturbed path are at a converged value in accordance with flags from said first and second plurality of flags;

modifying the nominal system physical inventory value and the nominal system stock delivery value based on the nominal system stock on order value;

checking if an order is to be placed, based on the s value and the nominal system physical inventory value, and if the order is to be placed, performing steps (a) and (b) of (a) constructing a perturbed path with respect to the change in q corresponding to said $\Delta$ value in response to first and second plurality of flags, and (b) calculating a value for the order based on the nominal system physical inventory value and the S value;

setting said second plurality of flags based on the system state of the nominal system;

generating a demand value;

constructing a perturbed system path with respect to the change in s corresponding to said $\Delta$ value based on a state of said first plurality of flags;

updating a plurality ofperiod statistics representing said nominal system physical inventory value and a lost sale value;

tracing a path for the first perturbed system based on the plurality of period statistics from said updating step;

updating a second plurality of period statistics representing said first perturbed system physical inventory value and a first perturbed system lost sale value;

cumulating at least one of said second plurality of difference statistics for the first perturbed system with respect to the change in s corresponding to the $\Delta$ value;

tracing a path for the second perturbed system based on a state of said second plurality flags;

updating a plurality of period statistics for the second perturbed system with respect to the change in q corresponding to the $\Delta$ value;

cumulating a plurality of difference statistics for the second perturbed system with respect to changes in q corresponding to the $\Delta$ value;

updating a plurality of cumulative statistics for the nominal system based on said step of updating a plurality of period statistics;

performing adjusted infinitesimal perturbation analysis calculations based on a state of the second plurality of flags;

incrementing the value t of the time increment counter;

if the value t is less than T repeating the step of determining if the nominal path and the first perturbed path and the nominal path and the second perturbed path are at a converged value and all subsequent steps in order, else updating a plurality of average statistics representing a sensitivity change in an average inventory and average lost sale performance of the inventory system with respect to the $\Delta$ change in s and q, where said plurality of average statistics are used to identify an optimum s and q value for an inventory system, and managing an inventory level of said (R,s,S) inventory system based on said optimum s and q value.

13. A method for generating a sensitivity information according to claim 12 further comprising the steps of:

(c) initializing a replication counter value n to a starting value;

(d) performing the step of initializing a first plurality of flags and all subsequent steps in order;

(e) incrementing the replication counter value; and (f) repeating said steps (d) and (e), wherein the step of generating a demand generates a stream of random values for each replication, based on a predetermined demand function, until the replication counter value equals a predetermined number N, whereby said step of updating a plurality of average statistics representing a sensitivity change in an average inventory and average lost sale performance of the inventory system with respect to the $\Delta$ change in s and q reflects the average of said average statistics over the N replications.

14. A computer-implemented method for generating sensitivity information with respect to s and S values in an(s,S) inventory system, comprising the steps of:

initializing a reorder point s value, a reorder-up-to level S value, a nominal system physical inventory value, a nominal system stock delivery value, a nominal system stock on order value, and a sum of the nominal system physical inventory and the nominal system stock-on-order value, where said nominal system values correspond to a state of a nominal inventory system based on said s and S values;

setting a $\Delta$ value representing a delta change in the reorder point s and in a q point, where q=(S−s);

initializing a first plurality of flags representing a sequence of events associated with the physical inventory of the nominal system and a first perturbed system, respectively, said first perturbed system based on said s value perturbed by the $\Delta$ value;

initializing a second plurality of flags representing a sequence of events associated with the physical inventory of the nominal system and a second perturbed system, respectively, said second perturbed system based on said q value perturbed by the $\Delta$ value;

initializing a third plurality of flags representing a system state of said nominal system, with respect to a time increment t, said system state including whether or not an order has been placed prior to t, whether or not an inventory is less than or equal to a zero value, and whether or not an order is being received;

setting a counter value t for the time increment t to a starting number;

determining if the nominal path and the first perturbed path and the nominal path and the second perturbed path are at a converged value in accordance with a flag from said first, a flag from said second and a flag from said third plurality of flags;

modifying the nominal system physical inventory value and the nominal system stock delivery value based on the nominal system stock on order value;

checking if an order is to be placed, based on the s value and the nominal system physical inventory value, and if the order is to be placed, performing steps (a) and (b) of (a) checking at least one of said second plurality of flags and said third plurality of flags for starting a trace of the perturbed path with respect to changes in q, and constructing a perturbed path based on said checking, and (b) calculating a value for the order based on the nominal system physical inventory value and the S value;

setting at least one of said third plurality of flags representing a system state of the nominal system based on at least one other of said third plurality;

generating a demand value;

checking said at least one of said first plurality of flags for starting a finite difference simulation with respect to changes in s and, based on said checking, constructing a perturbed system path with respect to changes in s;

updating a plurality of period statistics representing said nominal system physical inventory value and a lost sale value;

setting at least one of said third plurality flags to a logical ON based on the plurality of period statistics from said updating step;

checking at least one of said first plurality flags and tracing a path for the first perturbed system based on said checking;

updating a second plurality of period statistics representing said first perturbed system physical inventory value and a first perturbed system lost sale value;

cumulating at least one of said second plurality of difference statistics for the first perturbed system with respect to changes in s;

checking at least one of said second plurality flags and tracing a path for the second perturbed system based on said checking;

updating a plurality of period statistics for the second perturbed system with respect to changes in q;

cumulating a plurality of difference statistics for the second perturbed system with respect to changes in q;

updating a plurality of cumulative statistics for the nominal system based on said step of updating a plurality of period statistics;

checking at least one of said third plurality of flags;

performing adjusted infinitesimal perturbation analysis calculations based on said checking;

incrementing the value t of the time increment counter;

if the value t is less than T repeating the step of determining if the nominal path and the first perturbed path and the nominal path and the second perturbed path are at a converged value and all subsequent steps in order, else updating a plurality of average statistics representing a sensitivity change in an average inventory and average lost sale performance of the inventory system with respect to the $\Delta$ change in s and q and managing an inventory level of said (R,s,S) inventory system based on said average statistics.

15. A method for generating a sensitivity information according to claim 14 further comprising the steps of:

(c) initializing a replication counter value n to a starting value;

(d) performing the step of initializing a first plurality of flags and all subsequent steps in order;

(e) incrementing the replication counter value; and (f) repeating said steps (d) and (e), wherein the step of generating a demand generates a stream of random values for each replication, based on a predetermined demand function, until the replication counter value equals a predetermined number N, whereby said step of updating a plurality of average statistics representing a sensitivity change in an average inventory and average lost sale performance of the inventory system with respect to the $\Delta$ change in s and q reflects the average of said average statistics over the N replications.

* * * * *